US007139251B1

(12) United States Patent
Varma

(10) Patent No.: US 7,139,251 B1
(45) Date of Patent: Nov. 21, 2006

(54) SCHEDULING FOR LINKS HAVING CHANGING PARAMETERS

(75) Inventor: Subir Varma, San Jose, CA (US)

(73) Assignee: Aperto Networks, Inc., Milpitas, CA (US)

( * ) Notice: Subject to any disclaimer, the term of this patent is extended or adjusted under 35 U.S.C. 154(b) by 1026 days.

(21) Appl. No.: 10/120,209

(22) Filed: Apr. 9, 2002

Related U.S. Application Data

(60) Provisional application No. 60/294,552, filed on May 29, 2001.

(51) Int. Cl.
*H04J 3/00* (2006.01)
*H04J 3/16* (2006.01)
*H04Q 7/20* (2006.01)

(52) U.S. Cl. .................. 370/280; 370/437; 455/512

(58) Field of Classification Search ............... 370/252, 370/276–296, 328, 329, 337, 347, 437, 444, 370/455, 458; 455/422.1, 435.3, 452.2, 507, 455/509, 512, 515, 517
See application file for complete search history.

(56) References Cited

U.S. PATENT DOCUMENTS

| 5,684,791 | A | | 11/1997 | Raychaudhuri et al. | |
|---|---|---|---|---|---|
| 5,729,531 | A | | 3/1998 | Raith et al. | |
| 5,923,650 | A | * | 7/1999 | Chen et al. | 370/331 |
| 6,005,852 | A | | 12/1999 | Kokko et al. | |
| 6,006,073 | A | | 12/1999 | Glauner et al. | |
| 6,693,892 | B1 | * | 2/2004 | Rinne et al. | 370/348 |
| 6,697,378 | B1 | * | 2/2004 | Patel | 370/468 |
| 7,006,472 | B1 | * | 2/2006 | Immonen et al. | 370/332 |
| 2001/0053141 | A1 | * | 12/2001 | Periyalwar et al. | 370/337 |

FOREIGN PATENT DOCUMENTS

| EP | 0827312 A2 | 8/1997 |
|---|---|---|
| EP | 0794631 A2 | 9/1997 |
| WO | WO 98/59523 A2 | 12/1998 |
| WO | WO 98/59523 A3 | 12/1998 |
| WO | WO 99/18685 A1 | 4/1999 |
| WO | WO 99/44341 A1 | 9/1999 |

(Continued)

OTHER PUBLICATIONS

Inoue et al. "Link adaptive resource scheduling for wireless message transport." IEEE, Yokosuka Radio Communications Research Center, Communications Research Laboratory, Ministry of Posts and Telecommunications, 1998, pp. 2223-2228.

*Primary Examiner*—Ricky Q. Ngo
*Assistant Examiner*—John Shew
(74) *Attorney, Agent, or Firm*—Swernofsky Law Group PC

(57) ABSTRACT

The invention provides a method and system for scheduling for links having changing parameters. The method and system for scheduling for links having changing parameters is responsive to variations in communication capacity of communication links, such as wireless communication links in a wireless communication system. A BSC communicates with a plurality of CPE, including dynamically varying communication parameters for each CPE and substantially simultaneously scheduling traffic for each such CPE in response to those varying communication parameters. The BSC can schedule communication with each individual CPE in response to both (1) requested communication bandwidth and (2) varying communication capacity of the communication link between the BSC and that individual CPE. In a preferred embodiment, the BSC communicates with each CPE during a TDD frame. Sequences of such frames can each have differing communication parameters and can each be separately processed by the scheduling technique.

26 Claims, 7 Drawing Sheets

FOREIGN PATENT DOCUMENTS

| | | |
|---|---|---|
| WO | WO 00/13362 A1 | 3/2000 |
| WO | WO 00/21157 A1 | 4/2000 |
| WO | WO 00/22865 * | 4/2000 |
| WO | WO 00/22865 A2 | 4/2000 |
| WO | WO 01/50633 A1 | 7/2001 |
| WO | WO 01/50669 A1 | 7/2001 |
| WO | WO 02/13447 A2 | 2/2002 |
| WO | WO 02/25856 A2 | 3/2002 |

* cited by examiner

SCHEDULING FOR LINKS HAVING CHANGING PARAMETERS

This application claims the benefit of U.S. Provisional Application No. 60/294,552 filed May 29, 2001 hereby incorporated by reference.

BACKGROUND OF THE INVENTION

1. Field of the Invention

This invention relates to scheduling for links having changing parameters, such as for example those found in wireless communication systems including adaptive wireless communication.

2. Related Art

Wireless communication between a sender and a receiver includes sending information using a wireless communication link, in which the sender modulates information onto a wireless communication channel (such as a frequency band reserved for wireless communication between the sender and the receiver), and the receiver demodulates that information from the wireless communication channel, so as to recover the original information. The wireless communication link includes multiple (physical and other) characteristics, including characteristics of the sender's equipment and the receiver's equipment, characteristics of objects on or near communication pathways between the sender and the receiver, and characteristics of other communications overlapping communication between the sender and the receiver.

One problem with known systems is that, due to changes in the characteristics of the communication link between the sender and receiver, the communication capacity of the communication link can vary substantially over time. In attempting to allocate traffic between (and among) senders and receivers, known methods of scheduling presume that communication capacity of the communication link is relatively fixed. Accordingly, known methods of scheduling can result in relatively ineffective or inefficient communication between the sender and the receiver.

Accordingly, it would be advantageous to provide a technique for scheduling for links having changing parameters that is not subject to drawbacks of the known art.

SUMMARY OF THE INVENTION

The invention provides a method and system for scheduling for links having changing parameters. The method and system for scheduling for links having changing parameters is responsive to variations in communication capacity of communication links, such as wireless communication links in a wireless communication system. In a preferred embodiment, a base station controller (BSC) communicates with a plurality of customer premises equipment (CPE), including dynamically varying communication parameters for each CPE and substantially simultaneously scheduling traffic for each such CPE in response to those varying communication parameters. The BSC can schedule communication with each individual CPE in response to both (1) requested communication bandwidth and (2) varying communication capacity of the communication link between the BSC and that individual CPE. In a preferred embodiment, the BSC communicates with each CPE during a time-division duplex (TDD) frame; sequences of such frames can each have differing communication parameters and can each be separately processed by the scheduling technique.

The invention provides an enabling technology for a wide variety of applications for communication, so as to obtain substantial advantages and capabilities that are novel and non-obvious in view of the known art. Examples described below primarily relate to a wireless communication system, but the invention is broadly applicable to many different types of communication in which characteristics of the communication link are subject to change.

DETAILED DESCRIPTION OF THE PREFERRED EMBODIMENT

Figure 1:
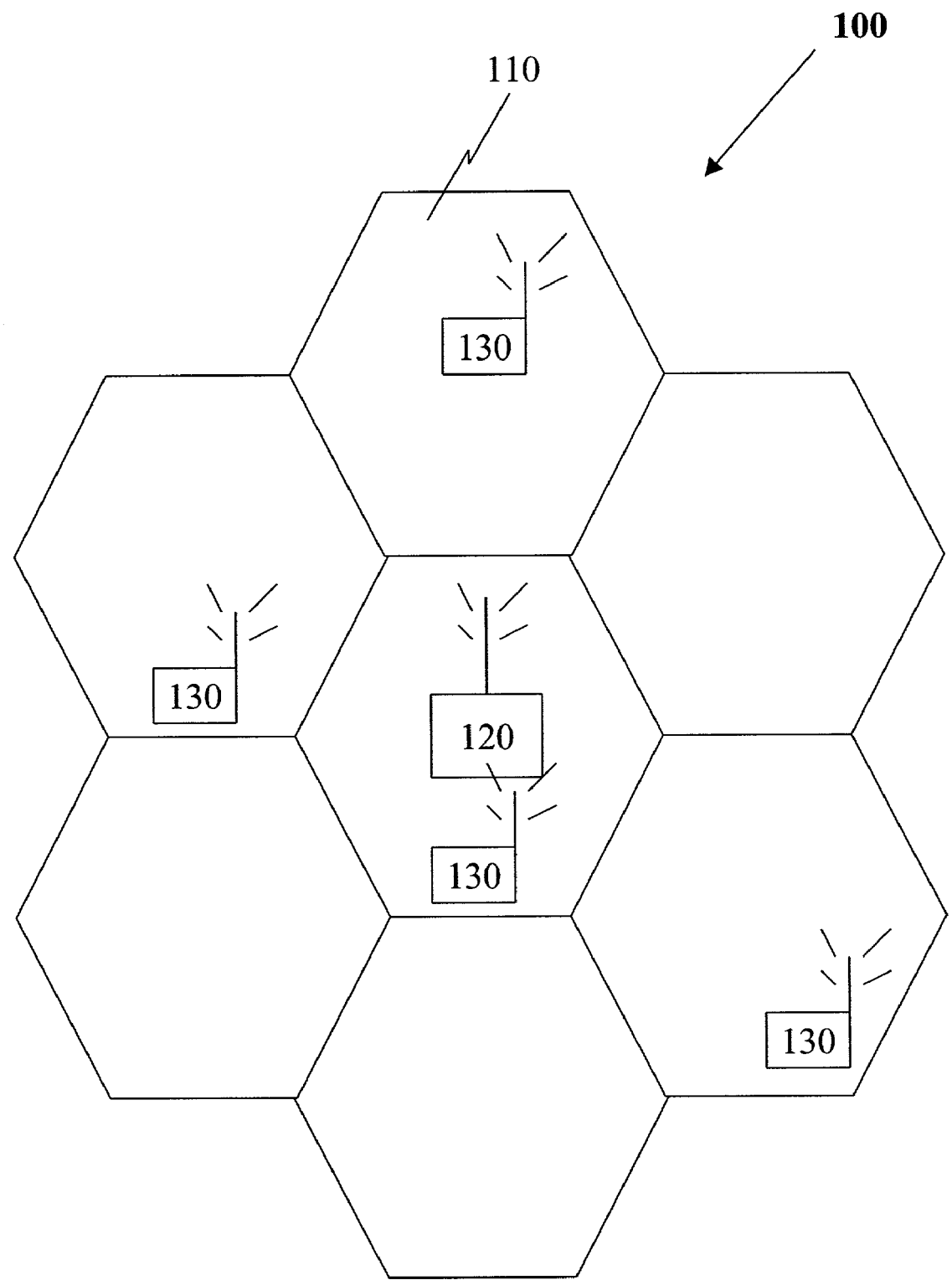
FIG. 1 shows a block diagram of a portion of a system including scheduling for links having changing parameters, such as in a system using wireless communication.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Applications

Inventions described herein can be used in conjunction with inventions described in the following documents.

U.S. patent application Ser. No. 09/475,716, Express Mail Mailing No. EL524780021US, filed Dec. 30, 1999 in the name of Reza Majidi-Ahy and Subir Varma, U.S. Pat. No. 6,654,384, titled "Integrated Self-Optimizing Multi Parameter and Multi Variable Point to Multi Point Communication";

U.S. patent application Ser. No. 09/475,642, Express Mail Mailing No. EL52478001US, filed Dec. 30, 1999 in the name of Subir Varma, Khuong Ngo, Jean Fuentes, Paul Truong, and Reza Majidi-Ahy, U.S. Pat. No. 6,650,623, titled "Adaptive Link Layer for Point to Multipoint Communciation System";

U.S. patent application Ser. No. 09/540,674, Express Mail Mailing No. EL524781512US: filed Mar. 31, 2000, in the name of Reza Majidi-Ahy, titled "Robust Topology Wireless Communication Using Broadband Access Points"; and U.S. patent application Ser. No. 09/604,784, Express Mail Mailing No. EL524781225US, filed Jun. 26, 2000, in the name of Reza Majidi-Ahy, titled "High-Capacity Scalable Integrated Wireless Backhaul for Broadband Access Networks".

Each of these documents is hereby incorporated by reference as if fully set forth herein. These documents are collectively referred to as the "Incorporated Disclosures."

Lexicography

The following terms refer or relate to aspects of the invention as described below. The descriptions of general meanings of these terms are not intended to be limiting, only illustrative.

base station controller (BSC)—in general, a device for performing coordination and control of a wireless communication cell. There is no particular requirement that the base station controller must be a single device; in alternative embodiments, the base station controller can include a portion of a single device, a combination of multiple devices, or some portion thereof.

communication link—in general, an element for sending information from a sender to a recipient. Although in a preferred embodiment the communication links referred to are generally wireless line of sight point to point communication links, there is no particular requirement that they are so restricted.

customer premises equipment (CPE)—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof. Examples of CPEs include; cellular telephones and wireless modems.

committed information rate (CIR)—a specified amount of guaranteed bandwidth (measured in bits per second) on a communication link. When purchasing communication service, the purchaser can specify a desired level of CIR. The communication vendor guarantees that information not exceeding the CIR level will be delivered. The communication vendor makes no specific commitment regarding additional traffic, so it is possible that such additional traffic will also be delivered but without guarantee.

committed bit rate (CBR)—similar to CIR, a specified number of bits per second on a communication link.

media access control (MAC)—a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network media. Consequently, each different type of network media requires a different MAC layer.

With reference to a wireless communication link, a set of characteristics or parameters relating to media access control of a communication link. For example, MAC parameters can include (a) a number of payload data bytes assigned per message, (b) frequency of acknowledgment messages and a number of message retransmission attempts, (c) a fraction of the communication link allocated to downstream versus upstream communication, and the like.

bandwidth—the amount of data that can be transmitted in a fixed amount of time. For digital devices, the bandwidth is usually expressed in bits per second (bps) or bytes per second.

system identification code (SID)—In general, a unique five digit number that is assigned to each cellular phone service by the FCC. The SID is used to identify the cellular carrier in a "home" area.

time division duplex (TDD)—in general, a type of multiplexing that combines data streams by assigning each stream a different time slot in a frame. In TDD systems the uplink and downlink channels can be considered reciprocal. Hence, in TDD systems uplink channel information may be used to achieve spatially selective transmission.

QoS parameters—in general, a set of characteristics or parameters relating to the quality of service for a communications link.

wireless transport layer—in general, a set of protocols and protocol parameters for sending and receiving information using wireless transport. In a preferred embodiment, the wireless transport layer is part of a multilayer systems architecture, in which the wireless transport layer is used by a logical transport layer such as Internet Protocol.

TDD frame—In general, a time division duplex frame is an orderly information fragment containing downstream and upstream payload portions that may be divided by a guard band. The start of the frame usually contains a header portion.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

The context of the invention is similar to that of the Incorporated Disclosures.

System Elements FIG. 1 shows a block diagram of a portion of a system including scheduling for links having changing parameters, such as in a system using wireless communication.

A system 100 includes a wireless communication cell 110 (or a portion thereof), a base station controller (BSC) 120, and one or more sets of customer premises equipment (CPE) 130.

The wireless communication cell 110 includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

The BSC 120 includes a processor, program and data memory, mass storage, and one or more antennas for sending or receiving information using wireless communication techniques.

Similar to the BSC 120, each CPE 130 includes a processor, program and data memory, mass storage, and one or more antennas for sending or receiving information using wireless communication techniques.

Communication among devices within the wireless communication cell 110 is preferably conducted on a one-to-one basis between each CPE 130 and the BSC 120. Thus, the BSC 120 communicates with each CPE 130, and each CPE 130 communicates with the BSC 120. In a preferred embodiment, CPE 130 do not communicate directly with other CPE 130. However, in alternative embodiments, CPE 130 may communicate directly with other CPE 130, with the characteristics of such communication being controlled either by the BSC 120, by one CPE 130 selected by the BSC 120, or by one CPE 130 mutually agreed to among a plurality of communicating CPE 130.

Communication between the BSC 120 and each CPE 130 is conducted using a TDD technique, in which time durations are divided into repeated individual frames, each one of which includes a "downstream" portion and an "upstream" portion. Unlike existing protocols in which transmissions are controlled by the transmitting side, the BSC 120 controls transmissions for both upstream and downstream directions, without specific requests from CPE 130.

During the downstream portion of each frame, the BSC 120 transmits, thus sending information to one or more CPE 130. During the upstream portion of each frame, each CPE 130 is potentially allocated a time slot for transmission, thus for sending information to the BSC 120. TDD techniques are known in the art of wireless communication.

Time Division Duplex Frame

Figure 2:
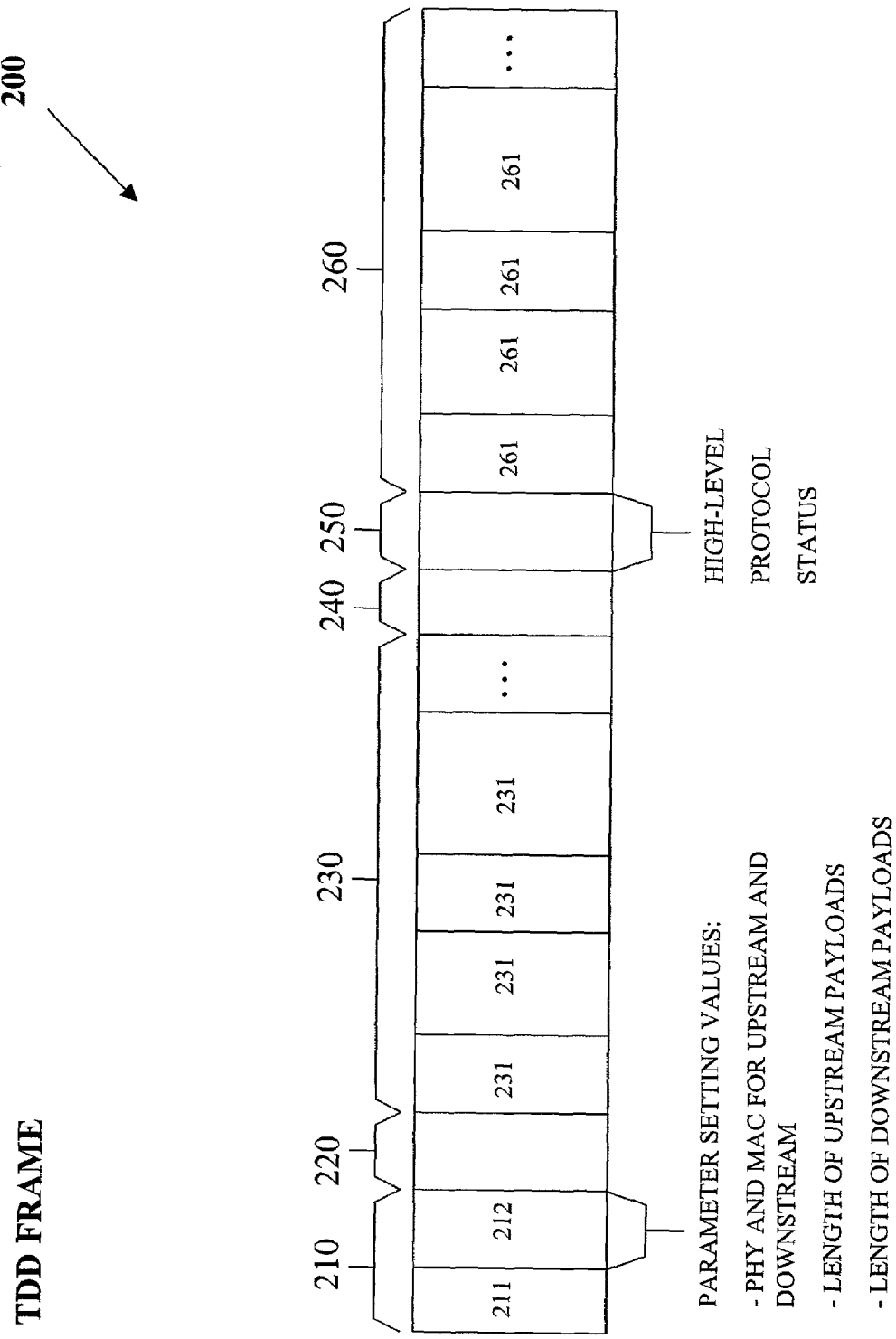
FIG. 2 shows a time division duplex frame used in a system as in FIG. 1.

FIG. 2 shows a time division duplex frame used in a system as in FIG. 1.

A time division duplex (TDD) frame 200 includes a time-synchronization portion 210, a first guard time 220, a downstream portion 230, a second guard time 240, a status-synchronization portion 250, and an upstream portion 260.

The time-synchronization portion 210 includes a first symbol 211 indicating the beginning of the TDD frame 200, and a sequence of parameter setting values 212 for each CPE 130. The BSC 120 uses the parameter setting values 212 to inform each selected CPE 130 individually and separately of (a) the PHY and MAC parameters the BSC 120 is using to send messages to that selected CPE 130, and (b) the PHY and MAC parameters the selected CPE 130 should use to send messages to the BSC 120 during its allocated part of the upstream portion 260.

The first guard time 220 includes a duration sufficient for the BSC 120 to assure that all CPE 130 do not interfere with each other when receiving from the BSC 120 or sending to the BSC 120.

The downstream portion 230 includes a sequence of downstream payload elements 231, each sent by the BSC 120 to a selected CPE 130. The BSC 120 determines a length for each of these downstream payload elements 231 and sends that information with the parameter setting values 212 in the time-synchronization portion 210. In alternative embodiments, the BSC 120 may divide the CPE 130 into classes and allocate one or more downstream payload elements 231 for each class of CPE 130. For example, the BSC 120 may allocate one or more downstream payload elements 231 for broadcast or multicast messages.

The second guard time 240 includes a duration sufficient for the BSC 120 to assure that the downstream portion 230 and the status-synchronization portion 250 do not interfere.

The status-synchronization portion 250 includes a sequence of status information so that the BSC 120 can agree with each selected CPE 130 regarding higher-level protocol status out-of-band from those higher-level protocols.

Similar to the downstream portion, the upstream portion 260 includes a sequence of upstream payload elements 261, each sent by a selected CPE 130 to the BSC 120. The BSC 120 (not the CPE 130) determines a length for each of these upstream payload elements 261 and sends that information with the parameter setting values 212 in the time-synchronization portion 210. In alternative embodiments, the BSC 120 may divide the CPE 130 into classes and allocate one or more upstream payload elements 231 for each class of CPE 130, such as for upstream bandwidth contention.

Method of Operation

Figure 3:
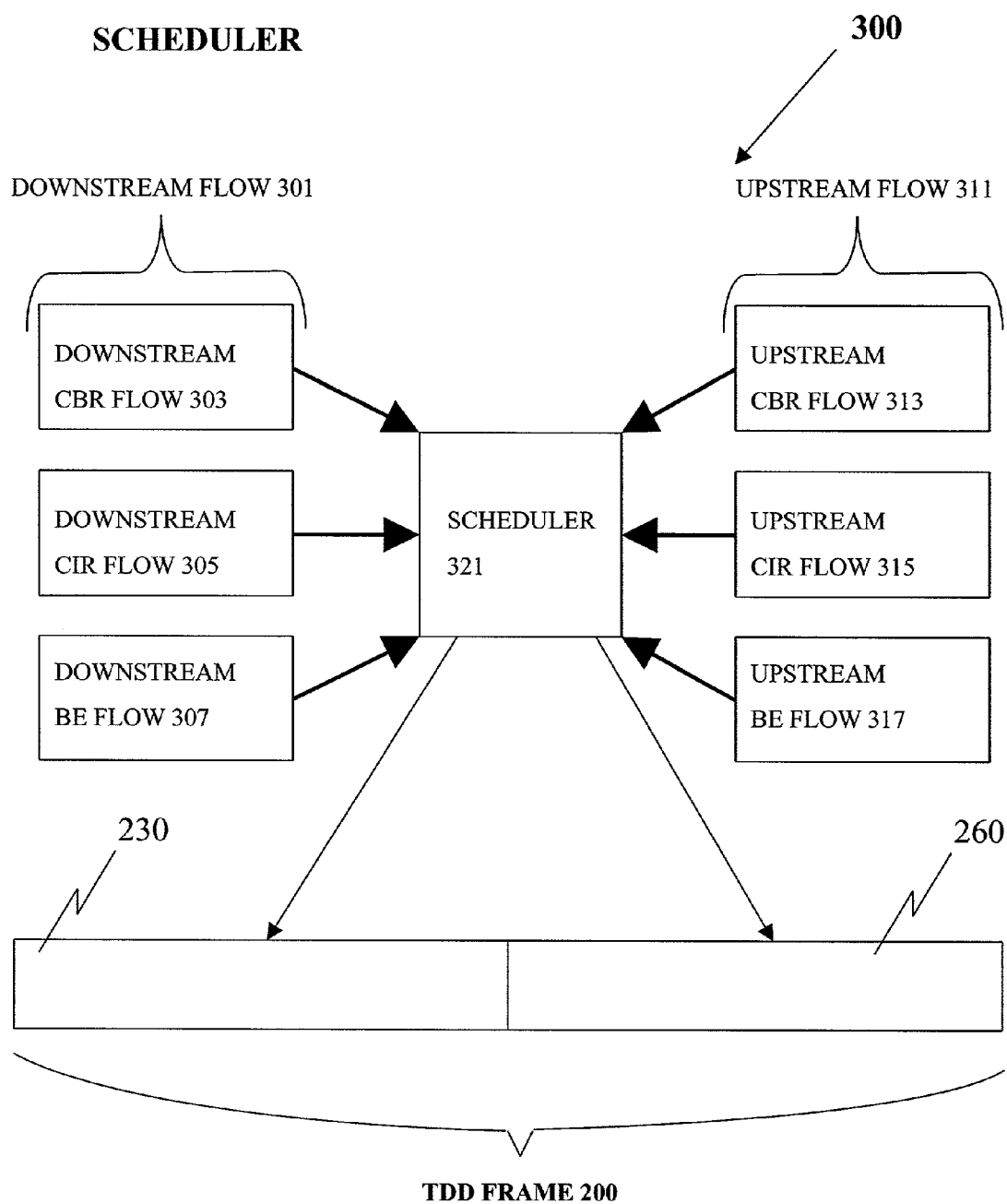
FIG. 3 shows a data flow diagram of a portion of a system including scheduling for links having changing parameters, such as in a system using wireless communication.

FIG. 3 shows a data flow diagram of a portion of a system including scheduling for links having changing parameters, such as in a system using wireless communication.

A downstream flow 301 includes a downstream CBR flow 303, a downstream CIR flow 305, and a downstream BE flow 307.

An upstream flow 311 includes an upstream CBR flow 313, an upstream CIR flow 315, and an upstream BE flow 317.

The scheduler 321 embodies the following features:

The scheduler 321 supports the different service classes within the downstream flow 301 and the upstream flow 311. This includes a set of CoS and QoS parameters for each flow.

The scheduler 321 makes efficient use of the available bandwidth by making unused portions of guaranteed bandwidth available for other flows.

The scheduler 321 selects the position of the data within the TDD frame 200, so that co-channel interference within a cell in minimized.

The scheduler 321 takes into account the variable symbol rates and constellation types per CPE 130 to ensure data are transferred in the most efficient manner.

The scheduler 321 takes into account WPDU error events and ARQ protocol operations.

The scheduler 321 takes into account wireless related channel impairments, such as signal fading and adjusts operational parameters accordingly.

The scheduler 321 integrates the various MAC management messages within the overall TDD frame structure.

The basic unit used by the scheduler 321 is a flow. A flow is a layer 2 entity that maps one-to-one with a SID. Flows exist in both directions (i.e. downstream flows 301 and upstream flows 311). Flows can be set up statically when the CPE 130 is initialized, or dynamically at any time later. Each flow belongs to a pre-defined class and is associated with its own set of CoS and QoS parameters.

Each CPE has at least one downstream BE flow 307 and at least one up-stream BE flow 317 associated with it. The scheduler periodically examines all backlogged downstream flow 301 and backlogged upstream flow 311 and selects the flows on the basis of CoS and QoS parameters identifying the flows.

Method of Operation—Downstream Map Construction

Figure 4:
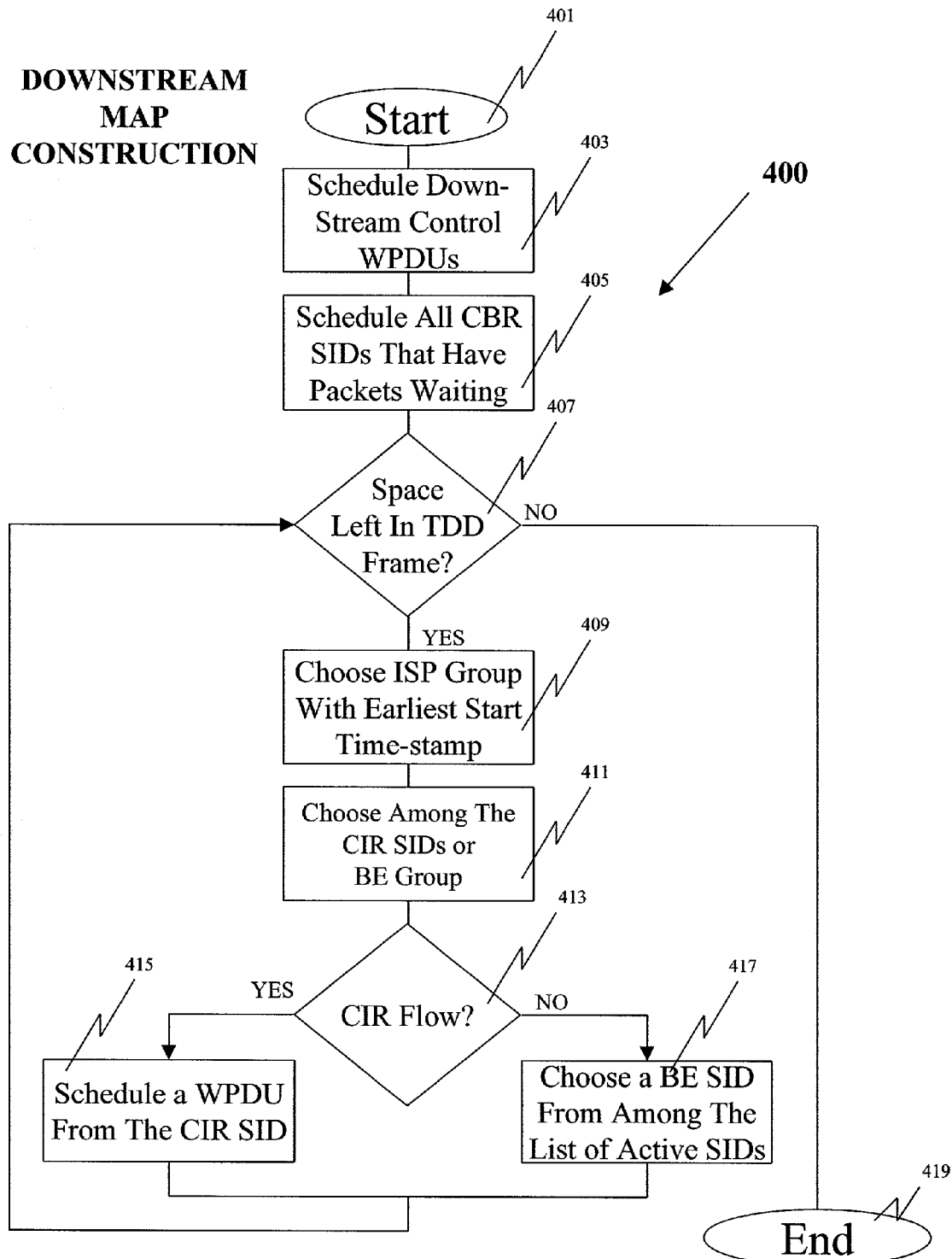
FIG. 4 illustrates a process flow diagram of a method for downstream map construction in a system including scheduling for links having changing parameters, such as in a system using wireless communication.

FIG. 4 illustrates a process flow diagram of a method for downstream map construction in a system including scheduling for links having changing parameters, such as in a system using wireless communication, indicated by general reference character 400. The downstream MAP construction process 400 initiates at a 'start' terminal 401. The downstream MAP construction process 400 continues to a 'schedule downstream control WPDUs' procedure 403 which schedules downstream control WPDUs that are pending and schedules broadcast and multicast packets in the beginning of the frame. A guard band is left between this region and the subsequent unicast region.

A 'schedule all CBR SIDs that have packets waiting' procedure 405 allows the scheduler 321 to schedule all CBR SIDs that have packets waiting.

A 'space left in TDD frame?' decision procedure 407 determines whether there is any additional space in the TDD frame to accommodate more data for downstream flows 301. If the 'space left in TDD frame?' decision procedure 407 determines there is no space left in the TDD frame, the downstream MAP construction process 400 terminates through an 'end' terminal 419.

A 'choose ISP group with earliest start time-stamp" procedure 409 chooses the ISP with the earliest start time stamp.

A 'choose among the CIR SIDs, or BE group' procedure 411 chooses among the CIR SIDs or the BE group for the flow with the earliest start time-stamp.

A 'CIR flow?' decision procedure 413 determines whether the flow is a CIR flow. If the 'CIR flow?' decision procedure 413 determines the flow is not a CIR flow, the downstream MAP construction process 400 continues to a 'choose a BE SID from among the list of active SIDs' procedure 417.

A 'schedule a WPDU from the CIR SID' procedure 415 allows the scheduler to schedule a WPDU from the CIR SID and update the SID queue status. If the SID queue is now empty the SID is removed from the active list and if there are no SIDs remaining from the ISP previously selected at the 'choose ISP group with earliest start time-stamp" procedure 409, then the ISP is removed from the active list. The downstream MAP construction process 400 continues to the 'space left in TDD frame?' decision procedure 407.

The 'choose a BE SID from among the list of active SIDs' procedure 417 causes a BE SID to be chosen from the list of active SIDs using a round robin schedule and a WPDU is scheduled from the SID. If the BE SID is now empty it is removed from the active list, and if all the BE SIDs are empty from the ISP previously selected at the 'choose ISP group with earliest start time-stamp" procedure 409, then the ISP is removed from the active list. The downstream MAP construction process 400 continues to the 'space left in TDD frame?' decision procedure 407.

Method of Operation—Upstream Map Construction

Figure 5:
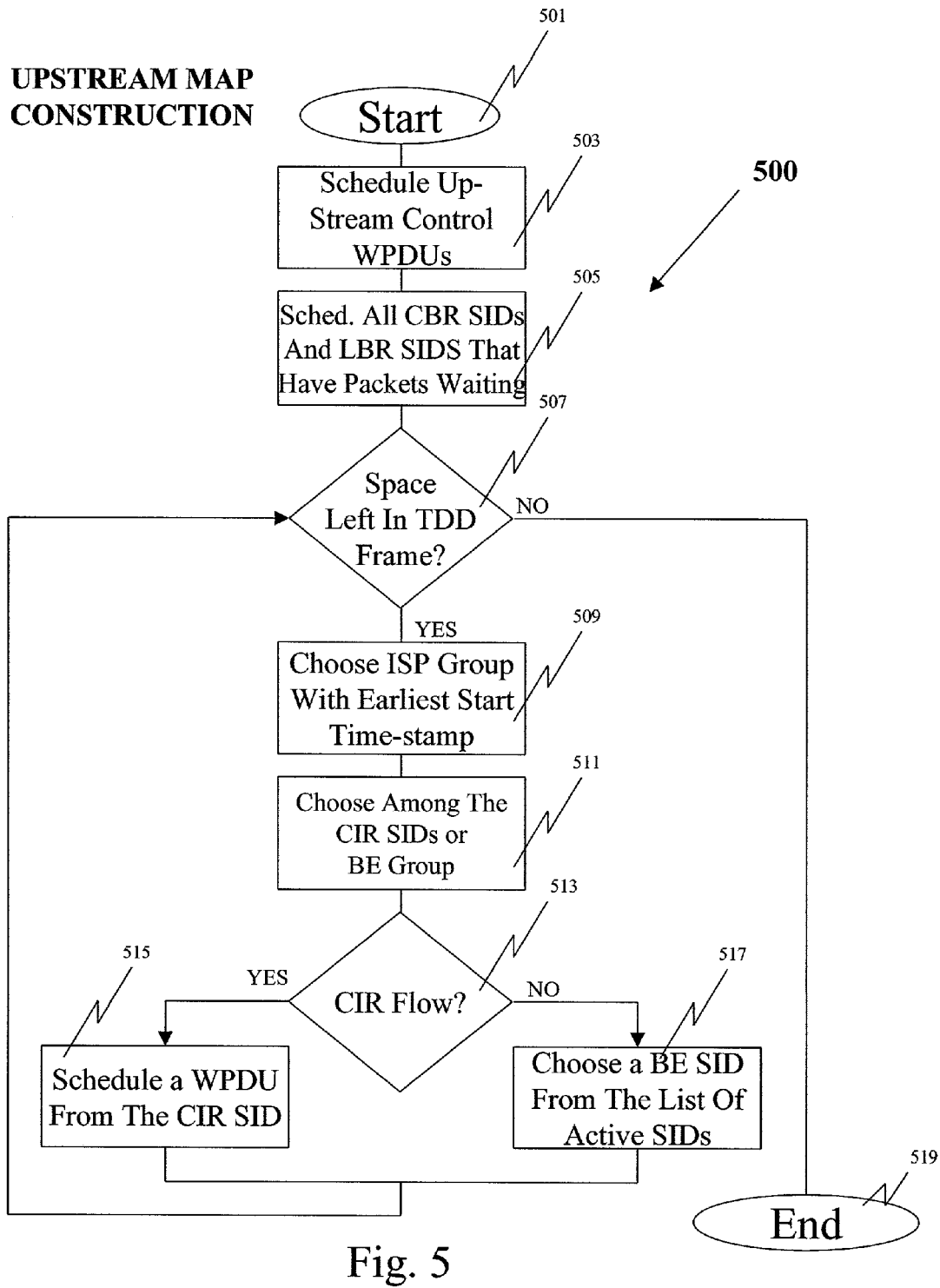
FIG. 5 illustrates a process flow diagram of a method for upstream map construction in a system including scheduling for links having changing parameters, such as in a system using wireless communication.

FIG. 5 illustrates a process flow diagram of a method for upstream map construction in a system including scheduling for links having changing parameters, such as in a system using wireless communication, indicated by general reference character 500. The up-stream MAP construction process 500 initiates at a 'start' terminal 501. The upstream MAP construction process 500 continues to a 'schedule upstream control WPDUs' procedure 503 which schedules upstream control WPDUs that are pending and schedules REQ and ACK slots at the beginning of the frame.

A 'schedule all CBR SIDs And LBR SIDS that have packets waiting' procedure 505 causes all CBR SIDs and LBR SIDs that have packets waiting to be scheduled. CBR SIDs are polled a specified number of times after they have sent their last packet to ensure all packets were actually sent.

A 'space left in TDD frame?' decision procedure 507 determines whether there is any additional space in the TDD frame to accommodate more data for transfer. If the 'space left in TDD frame?' decision procedure 507 determines there is no space left in the TDD frame, the upstream MAP construction process 500 terminates through an 'end' terminal 519.

A 'choose ISP group with earliest start time-stamp" procedure 509 chooses the ISP with the earliest time-stamp.

A 'choose among the CIR SIDs, or BE group' procedure 511 chooses among the CIR SIDs or BE group for the flow with the earliest time-stamp.

A 'CIR flow?' decision procedure 513 determines whether the flow is a CIR type of flow. If the 'CIR flow?' decision procedure 513 determines the flow is not a CIR flow, the upstream MAP construction process 500 continues to a 'choose a BE SID from the list of active SIDs' procedure 517.

A 'schedule a WPDU from the CIR SID' procedure 515 allows the scheduler to schedule a WPDU from the CIR SID and update the SID queue status. If the SID queue is now empty the SID is marked as pre-idle. If the resulting upstream transmission has no piggyback REQ, then the SID is marked as idle and the ISP is removed from the active list. The upstream MAP construction process 500 continues to the 'space left in TDD frame?' decision procedure 507.

A 'choose a BE SID from the list of active SIDs' procedure 517 causes a BE SID to be chosen from the list of active SIDs using a round robin schedule and a WPDU is scheduled from the SID. If the BE SID is empty it is removed from the active list. If all the SIDs are empty then the BE group is marked as idle. Also, if there are no Req (standalone or piggybacked) in the next frame, the BE group is marked as idle. The upstream MAP construction process 500 continues to the 'space left in TDD frame?' decision procedure 507.

Method of Operation—Upstream REQ Arrivals

Figure 6:
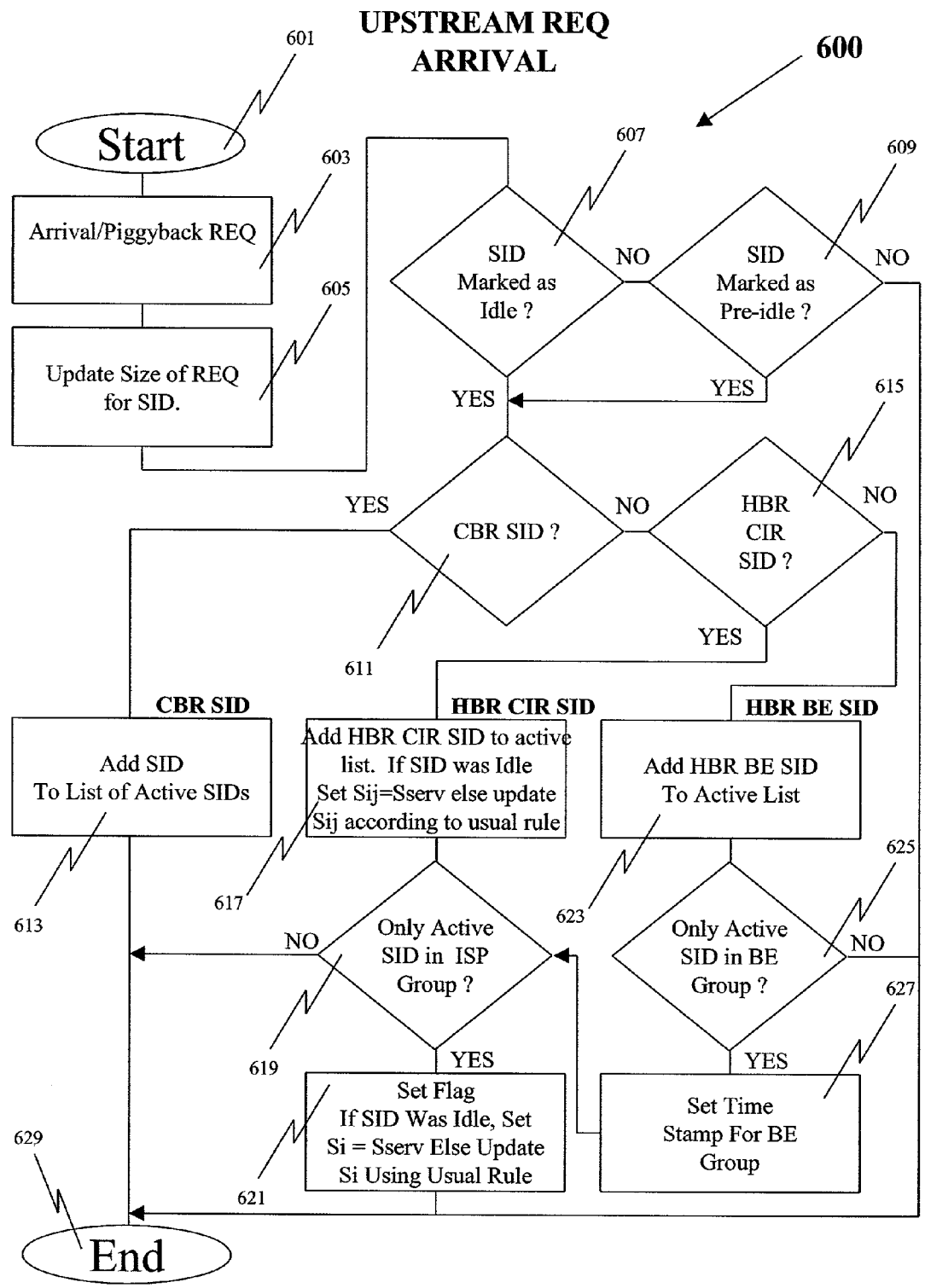
FIG. 6 shows a process flow diagram of a method for processing up-stream REQ arrivals in a system including scheduling for links having changing parameters, such as in a system using wireless communication.

FIG. 6 illustrates a process flow diagram of a method for upstream REQ arrivals processing in a system including scheduling for links having changing parameters, such as in a system using wireless communication, indicated by general reference character 600. The upstream REQ arrivals process 600 initiates at a 'start' terminal 601. The upstream REQ arrivals process 600 continues to an 'arrival/piggyback REQ' procedure 603 which allows the BSC 120 to receive acknowledgments and piggyback requests for transmission slots from the CPE 130.

An 'update size of REQ for SID' procedure 605 allows the SID to be classified as high bit rate (HBR) or low bit rate (LBR).

A 'SID marked as idle?' decision procedure 607 determines whether the SID is marked as idle. If the 'SID marked as idle?' decision procedure 607 determines that the SID is marked as idle, the upstream REQ arrivals process 600 continues to a 'CBR SID?' decision procedure 611.

A 'SID marked as pre-idle?' decision procedure 609 determines whether the SID has been marked as pre-idle. If the 'SID marked as pre-idle?' decision procedure 609 determines that the SID is not marked as pre-idle, the upstream REQ arrivals process 600 terminates through an 'end' terminal 629.

The 'CBR SID?' decision procedure 611 determines whether SID is of the CBR type. If the 'CBR SID?' decision procedure 611 determines that the SID is not of the CBR type the upstream REQ arrivals process 600 continues to a 'HBR CIR SID?' decision procedure 615.

An 'add SID to list of active SIDs' procedure 613 adds the SID to the active SIDs list. The upstream REQ arrivals process 600 terminates through an 'end' terminal 629.

The 'HBR CIR SID?' decision procedure 615 determines if the SID is of the HBR CIR type. If the 'HBR CIR SID?' decision procedure 615 determines that the SID is not of the HBR CIR type, the upstream REQ arrivals process 600 continues to an 'add HBR BE SID to active list' procedure 623.

An 'add HBR CIR SID to active list' procedure 617 allows a HBR CIR SID to be added to the active list.

An 'only active SID in ISP group?' decision procedure 619 determines whether the SID being processed is the only active SID. If the 'only active SID in ISP group' decision procedure 619 determines that the SID being processed is the only active SID in the ISP group, the upstream REQ arrivals process 600 terminates through an 'end' terminal 629.

A 'set flag' procedure 621 sets a flag variable for the only active SID in the ISP group according to conditions identified via the process and shown in FIG. 6. The upstream REQ arrivals process terminates through an 'end' terminal 629.

The 'add HBR BE SID to active list' procedure 623 adds a HBR BE SID to the active list.

An 'only SID in BE group?' decision procedure 625 determines whether there are any more SIDs in the BE group. If the 'only SID in BE group?' decision procedure 625 determines there are no more SIDs in the BE group, the upstream REQ arrivals process 600 terminates through an 'end' terminal 629.

A 'set time-stamp for BE group' procedure 627 sets the time-stamp for the BE group depending on whether the SID was identified as being marked idle or pre-idle.

The upstream REQ arrivals process 600 continues to the 'only active SID in ISP group' decision procedure 619.

Method of Operation—Downstream Packet Arrivals

Figure 7:
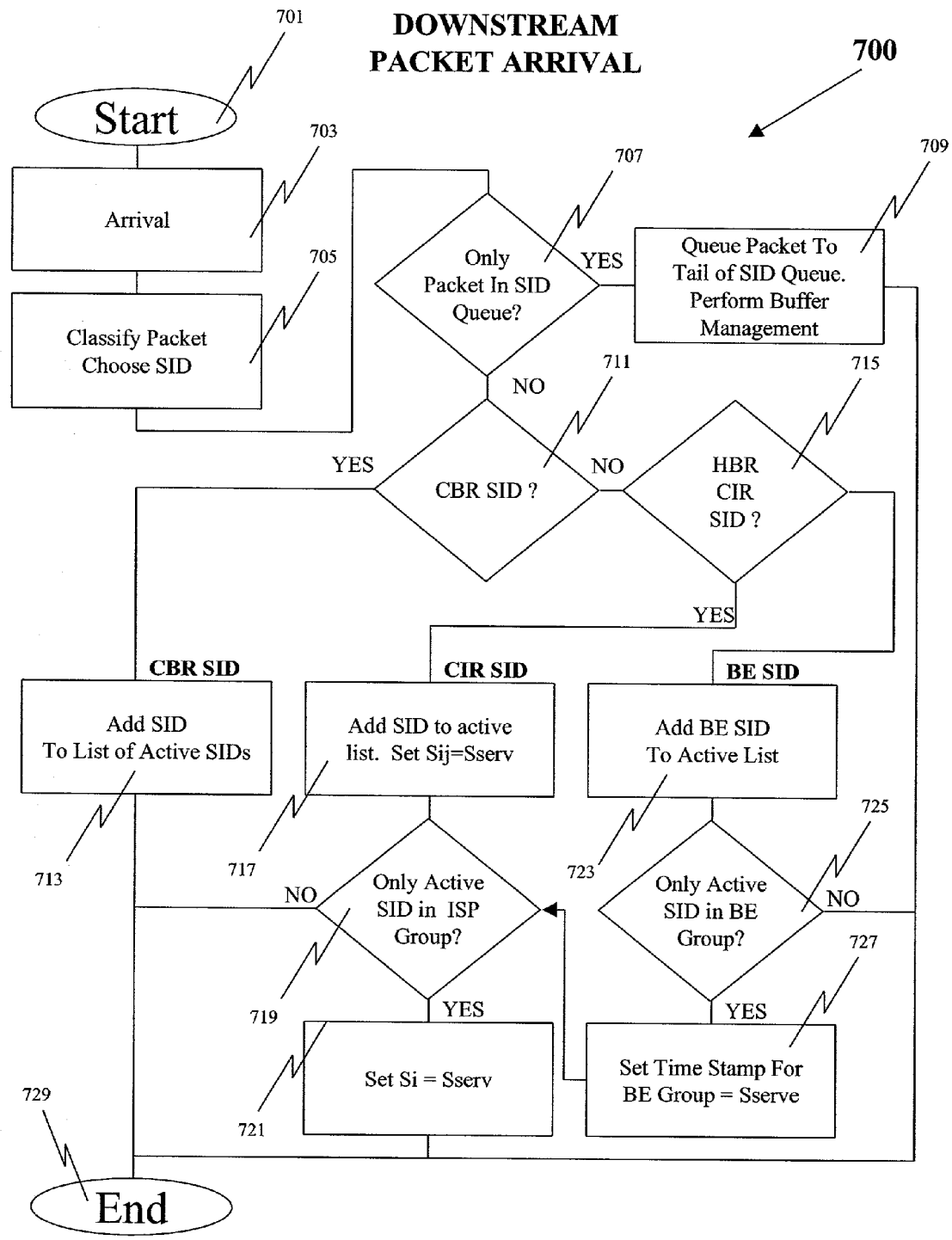
FIG. 7 shows a process flow diagram of a method for processing downstream packet arrival in a system including scheduling for links having changing parameters, such as in a system using wireless communication.

FIG. 7 illustrates a process flow diagram of a method for downstream packet arrival processing in a system including scheduling for links having changing parameters, such as in a system using wireless communication, indicated by general reference character 700. The downstream packet arrival process 700 continues to a 'Arrival' procedure 703 which allow allows packets to arrive.

A 'classify packet choose SID procedure' classifies the packet as CBR SID, CIR SID, or BE SID, and chooses a SID for the packet.

An 'only packet in SID queue?' decision procedure 707 determines whether the packet is the only packet in the SID queue. If the 'only packet in SID queue?' decision procedure 707 determines that the packet is not the only packet in the SID queue, the downstream packet arrival process continues to a 'CBR SID?' decision procedure 711.

A 'queue packet to tail of SID queue' procedure 709 queues the packet to the end of the SID queue and performs buffer management. The downstream packet arrival process 700 terminates through as 'end' terminal 729.

The 'CBR SID?' decision procedure 711 determines whether the SID is of the CBR type. If the 'CBR SID?' decision procedure 711 determines that the SID is not of the CBR type, the downstream packet arrival process continues to a 'HBR CIR SID?' decision procedure 715.

An 'add SID to list of active SIDs' procedure 713 adds the SID to the list of active SIDs and the downstream packet arrival process 700 terminates through an 'end' terminal 729.

The 'HBR CIR SID?' decision procedure 715 determines whether the SID is of the HBR CIR type. If the 'HBR CIR SID?' decision procedure 715 determines that the SID is not of the HBR CIR type, the downstream packet arrival process 700 continues to an 'add BE SID to active list' procedure 723.

An 'add CIR SID to active list' procedure 717 adds the SID to the active list and sets the appropriate variables.

An 'only active SID in ISP group' decision procedure 719 determines whether the SID is the only SID in the ISP group. If the 'only active SID in ISP group' decision procedure 719 determines that the SID is not the only SID in the ISP group, the downstream packet arrival process 700 terminates through an 'end' terminal 729.

A 'set Si=Sserv' procedure 721 sets variable $Si=Sserv0$ as shown in FIG. 7, and the downstream packet arrival process 700 terminates through an 'end' terminal 729.

The 'add BE SID to active list' procedure 723 adds the SID to the active list.

An 'only SID in BE group?' decision procedure 725 determines whether the SID is the only SID in the BE group. If the 'only SID in BE group' decision procedure 725 determines that the SID is the only SID in the BE group, the downstream packet arrival process 700 terminates through an 'end' terminal 729.

A 'set time-stamp for BE group=Sserve' procedure 727 sets the time-stamp for the BE group to Sserve. The downstream packet arrival process 700 continues with the 'only active SID in ISP group' procedure 719.

Generality of the Invention

The invention has general applicability to various fields of use, not necessarily related to the services described above. For example, these fields of use can include one or more of, or some combination of, the following:

The invention is applicable to other forms of wireless communication, such as frequency division multiple access (FDMA) or code division multiple access (CDMA, also known as spread spectrum communication);

The invention is applicable to any non-wireless communication, in which relative effectiveness or efficiency of communication can be achieved from dynamically adjusting communication parameters, such as physical parameters or MAC parameters. For example, the invention can be generalized to non-wireless communication using modems in which equalization parameters are to be dynamically adjusted.

The invention is applicable to other wireless communication systems, such as satellite communication systems and (microwave tower or other) point to point transmission systems.

The invention is applicable to both fixed wireless communication systems, in which customer premises equipment do not move relative to the BSC 120, and to mobile wireless communication systems, and which customer premises equipment move substantially relative to the BSC 120.

Other and further applications of the invention in its most general form, will be clear to those skilled in the art after perusal of this application, and are within the scope and spirit of the invention. Although preferred embodiments are disclosed herein, many variations are possible which remain within the concept, scope, and spirit of the invention, and these variations would become clear to those skilled in the art after perusal of this application.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method of managing time division duplexing across plural channels, including the steps of:
   establishing a communication session between two or more stations using a duplex protocol, said stations including some combination of customer premises equipment and at least one base station controller each having a system identification code (SID);
   defining one or more classes of service for data flows to and from each one of said stations, whereby said classes include (1) a guaranteed transfer rate, and (2) a best efforts transfer rate;
   assigning a priority for transmission of data based on some combination of said classes of service and a data time-stamp, said time-stamp indicative of the age of said data; and
   scheduling data for transmission based on said priority;
   wherein said step of scheduling further includes the steps of
   generating different classes of upstream and down stream data flows, said data flows including class of service and quality of service parameters;
   selecting data for transmission based on the variable symbol rates and constellation types of said customer premises equipment; and
   maximizing transmission of each time division duplex frame at the physical wireless and media access control levels.

2. The method of claim 1, wherein said scheduling maximizes the payload for each time division duplex frame.

3. The method of claim 1, wherein said two or more stations are in wireless communication with each other.

4. The method of claim 1, wherein said step of generating further includes the steps of
   constructing a downstream map, wherein all wireless payload data units in a guaranteed transfer rate class of service that have packets waiting are scheduled for transmission;
   determining whether any space remains in said time division duplex frame for additional data, said space being potentially available as a result of an under-used guaranteed transfer rate assigned to a particular SID; and
   choosing the data to fill said space.

5. The method of claim 4, wherein said step of choosing includes the step of determining priority of transmission based on said time-stamp and said class of service of a packet.

6. The method of claim 4, wherein priority of transmission is given to said guaranteed transfer rate class.

7. The method of claim 1, wherein said step of generating further includes the steps of
   constructing an upstream map, wherein all wireless payload data units in one or more identified classes that have packets waiting are scheduled for transmission;
   determining whether any space remains in said time division duplex frame for additional data, said space being potentially available as a result of an under-used guaranteed transfer rate assigned to a particular SID; and
   choosing data to fill said space.

8. The method of claim 7, wherein said step of choosing includes the step of determining priority based on some combination of said time-stamp and said class of service of a said packet.

9. The method of claim 1, wherein said step of maximizing includes the steps of
   selecting the position of data within a time division duplex frame such that co-channel interference within a communication cell is minimized;
   utilizing unused portions of guaranteed bandwidth for other data to be transmitted;
   adjusting operation dynamically to account for wireless payload data unit errors and acknowledgment requests;
   compensating for wireless related channel impairments; and
   integrating media access control messages within a time division duplex frame structure.

10. A base station controller communicating with at least one customer premises equipment over a communication link, said base station controller comprising a transceiver and a controller that performs the steps of:
    establishing a communication session between two or more stations using a duplex protocol, said stations including some combination of customer premises equipment and said base station controller, wherein each said customer premises equipment has an associated system identification code (SID);
    defining one or more classes of service for data flows to and from each one of said stations, whereby said classes include (1) a guaranteed transfer rate, and (2) a best efforts transfer rate;
    assigning a priority for transmission of data based on some combination of said classes of service and a data time-stamp, said time-stamp indicative of the age of said data; and
    scheduling data for transmission based on said priority;
    wherein said step of scheduling includes performing the steps of
    generating different classes of upstream and down stream data flows, said data flows including class of service and quality of service parameters;
    selecting data for transmission based on the variable symbol rates and constellation types of said customer premises equipment; and
    maximizing transmission of each time division duplex frame at the physical wireless and media access control levels.

11. The base station controller of claim 10, wherein said scheduling maximizes the payload for each time division duplex frame.

12. The base station controller of claim 10, wherein said two or more stations are in wireless communication with each other.

13. The base station controller of claim 10, wherein said step of generating further includes the steps of
    constructing a downstream map, wherein all wireless payload data units in a guaranteed transfer rate class of service that have packets waiting are scheduled for transmission;
    determining whether any space remains in said time division duplex frame for additional data, said space being potentially available as a result of an under-used guaranteed transfer rate assigned to a particular SID; and choosing the data to fill said space.

14. The base station controller of claim 13, wherein said step of choosing includes the step of determining priority of transmission based on said time-stamp and said class of service of a packet.

15. The base station controller of claim 13, wherein priority of transmission is given to said guaranteed transfer rate class.

16. The base station controller of claim 10, wherein said step of generating further includes the steps of constructing an upstream map, wherein all wireless payload data units in one or more identified classes that have packets waiting are scheduled for transmission;

determining whether any space remains in said time division duplex frame for additional data, said space being potentially available as a result of an under-used guaranteed transfer rate assigned to a particular SID; and choosing data to fill said space.

17. The base station controller of claim 16, wherein said step of choosing includes the step of determining priority based on some combination of said time-stamp and said class of service of a packet.

18. A computer-readable memory storing information including computer-executable instructions, said instructions executed by a processor to manage time division duplexing across plural channels, the instructions comprising:

establishing a communication session between two or more stations using a duplex protocol, said stations including some combination of customer premises equipment and at least one base station controller each having a system identification code (SID);

defining one or more classes of service for data flows to and from each one of said stations, whereby said classes include (1) a guaranteed transfer rate, and (2) a best efforts transfer rate;

assigning a priority for transmission of data based on some combination of said classes of service and a data time-stamp, said time-stamp indicative of the age of said data; and scheduling data for transmission based on said priority;

wherein said step of scheduling includes performing the steps of generating different classes of upstream and down stream data flows, said data flows including class of service and quality of service parameters;

selecting data for transmission based on the variable symbol rates and constellation types of said customer premises equipment; and maximizing transmission of each time division duplex frame at the physical wireless and media access control levels.

19. The memory of claim 18 including instructions for maximizing the payload of each time division duplex frame.

20. The memory of claim 18, wherein said step of generating further includes the steps of constructing a downstream map, wherein all wireless payload data units in a guaranteed transfer rate class of service that have packets waiting are scheduled for transmission;

determining whether any space remains in said time division duplex frame for additional data, said space being potentially available as a result of an under-used guaranteed transfer rate assigned to a particular SID; and choosing the data to fill said space.

21. The memory of claim 20, wherein said step of choosing includes the step of determining priority of transmission based on said time-stamp and said class of service of a packet.

22. The memory of claim 20, wherein priority of transmission is given to said guaranteed transfer rate class.

23. The memory of claim 18, wherein said step of generating further includes the steps of constructing an upstream map, wherein all wireless payload data units in one or more identified classes that have packets waiting are scheduled for transmission;

determining whether any space remains in said time division duplex frame for additional data, said space being potentially available as a result of an under-used guaranteed transfer rate assigned to a particular SID; and choosing data to fill said space.

24. The memory of claim 23, wherein said step of choosing includes the step of determining priority based on some combination of said time-stamp and said class of service of a said packet.

25. The memory of claim 18, wherein said step of maximizing includes the steps of selecting the position of data within a time division duplex frame such that co-channel interference within a communication cell is minimized;

utilizing unused portions of guaranteed bandwidth for other data to be transmitted;

adjusting operation dynamically to account for wireless payload data unit errors and acknowledgment requests;

compensating for wireless related channel impairments; and integrating media access control messages within a time division duplex frame structure.

26. The base station controller of claim 10, wherein said step of maximizing includes the steps of selecting the position of data within a time division duplex frame such that co-channel interference within a communication cell is minimized;

utilizing unused portions of guaranteed bandwidth for other data to be transmitted;

adjusting operation dynamically to account for wireless payload data unit errors and acknowledgment requests;

compensating for wireless related channel impairments; and integrating media access control messages within a time division duplex frame structure.

* * * * *